UNITED STATES PATENT OFFICE.

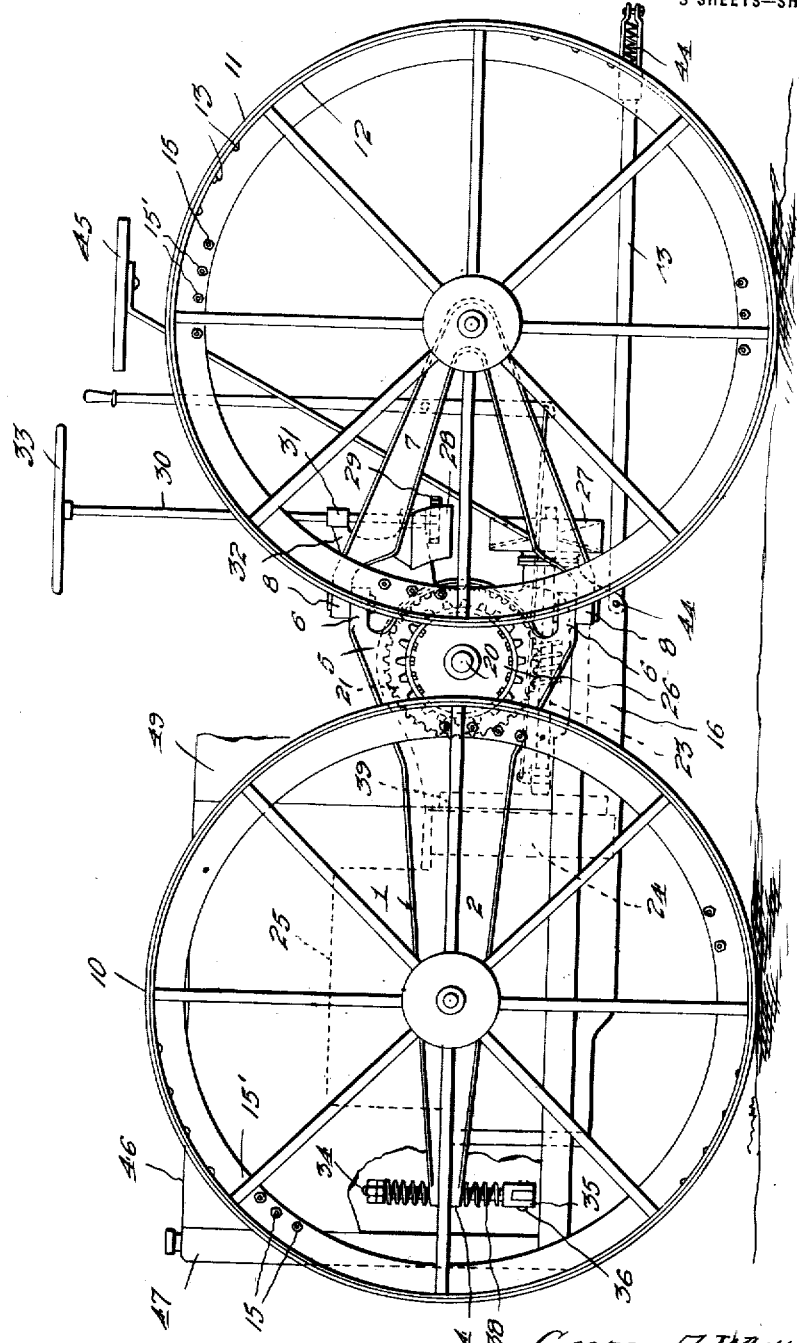

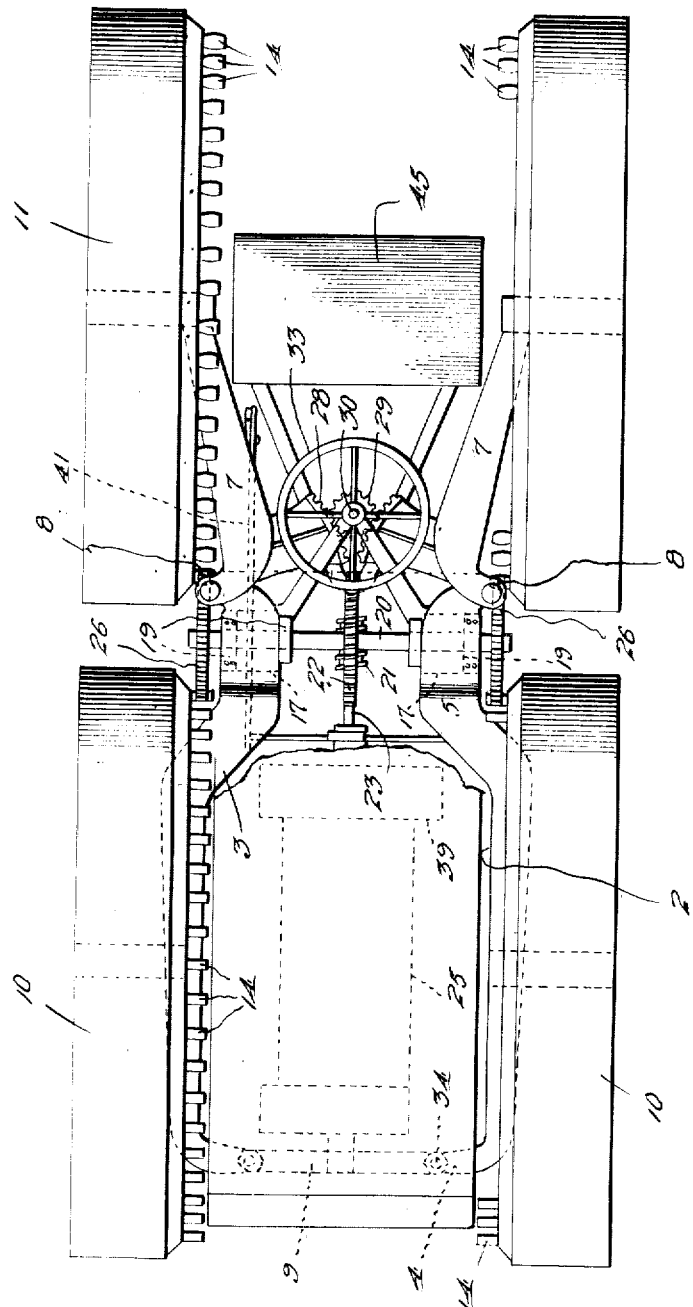

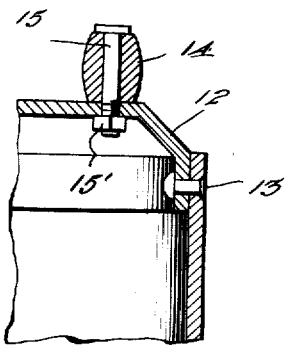
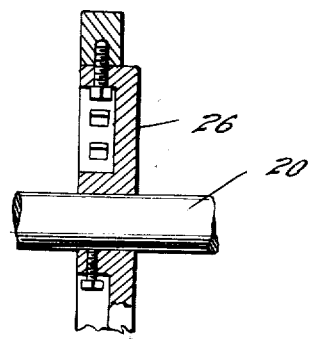
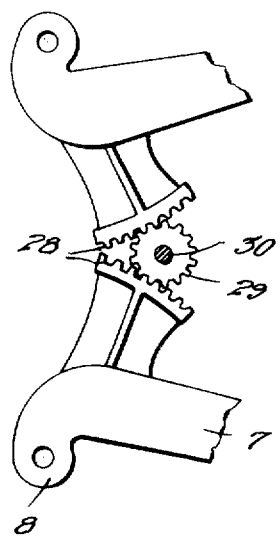
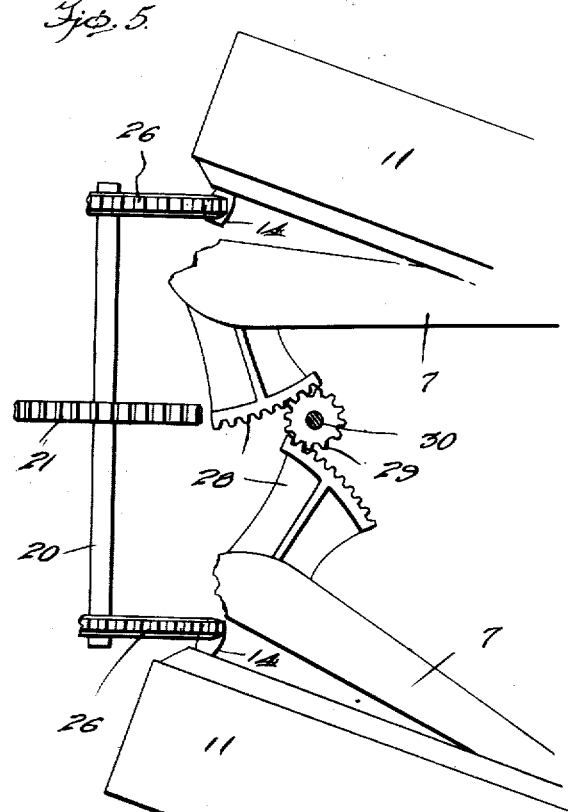

GEORGE ALBERT WHITTEMORE, OF LUDINGTON, MICHIGAN.

TRACTOR.

1,267,028.  Specification of Letters Patent.  Patented May 21, 1918.

Application filed January 12, 1917. Serial No. 141,997.

*To all whom it may concern:*

Be it known that I, GEORGE ALBERT WHITTEMORE, a citizen of the United States, and resident of Ludington, in the county of Mason and State of Michigan, have invented certain new and useful Improvements in Tractors, of which the following is a specification.

The present invention has reference, generally, to motor vehicles; and, the invention relates more particularly, to an improved four wheel drive tractor.

The invention has for its principal object to provide a four wheel drive tractor wherein the driven wheels will receive an equal and uniform driving power from the prime mover of the tractor in such a manner as to render the vehicle especially adaptable for heavy duty purposes.

As an object of equal importance, the invention aims to provide novel steering mechanism, whereby, the course of the tractor may be governed by the operator; the steering mechanism being directly connected to the bearings of the tractor steering wheel, thereby, facilitating moving of the wheels to the desired positions and eliminating intricate arrangements of gearing.

Further, another object of the present invention resides in the provision of spring suspension means for the running gear of the tractor, thus, preventing transmission of shock, such as may be encountered during travel of the tractor over rough or broken ground, to the prime mover and transmission gearing of the vehicle, consequently, lessening the liability of various disabilities which are apt to otherwise occur, should no means of absorbing shock be provided.

Other objects relate to considerations of economy of production, durability in use, and convenience in operation of the several mechanisms or parts entering into the construction of elements and the above defined general organization of said elements.

As hereinafter pointed out in the claims, some of the novel features of the present invention reside in certain coöperative relationships existing between certain of the elements, of which the disclosed constructional embodiments are merely illustrative rather than definitive, while other novel features reside in the general organization of such elements; and still others reside in the constructional characteristics of the particular embodiments herein disclosed as the preferred instrumentalities through which to realize such coöperative relationship and general organization.

One embodiment of the subject matter of the present invention is shown by way of illustration in the accompanying drawings, in which:

Figure 1 is a side elevation of my improved tractor;

Fig. 2 is a top plan thereof;

Fig. 3 is a fragmental detail in section showing the arrangement of the demountable gear teeth as used in conjunction with the tractor wheels;

Fig. 4 is a similar view showing the arrangement of the demountable gear teeth on the driving gears;

Fig. 5 is a fragmental detail of the steering gears; and

Fig. 6 is a similar view showing the relative positioning of the steering knuckles to the operating gear of the steering collar when turned.

Similar characters of reference are employed in all of the above described views, to indicate corresponding parts.

Referring now more specifically to the several figures of the said drawings, the improved tractor includes the usual frame, indicated in its entirety by the numeral 1 and comprising side bars 2 and 3, the forward ends of which are bent inwardly at substantially right-angles to the body portion thereof as at 4, while the remaining or rear portions are offset as at 5 and enlarged in order that the driving gear of the vehicle may be efficiently supported thereon. It will be noted, that the extremities of the offset rear portions 5 of the side bars 2 and 3 are formed or bifurcated, thus, providing a plurality of laterally extending bearing arms 6, said arms being provided with vertically alined bearing openings, the purpose of which will be subsequently apparent. To complete the frame 1, pairs of divergent bars 7 having their outer ends reduced to provide bearing arms 8, complemental to the bearing arms 6 and provided with similar bearing openings therein, are employed and embrace the forked extremity of the side bars 2 and 3. Thus, by passing pivot pins through the alined bearing openings as formed in the bearing arms 6 and 8, pivotal movement of the said divergent arms 7 with relation to their respective side arms 2 and 3 will be permitted, consequently, providing a dirgible tractor frame. The inturned forward ends of the frame bars 2 and 3 are adapted to serve as means for supporting the transverse connecting bar 9, the manner of which will be subsequently described.

Wheels, generally indicated by the numerals 10 and 11, are rotatably mounted upon suitable stub axles carried on the frame and arranged on the outer side of the side bars 2 and 3 and the divergent arms 7, it being noted that, the wheels 10 are arranged approximately intermediate the ends of the side bars 2 and 3, while the wheels 11 are arranged in proximity of the outer extremities of the divergent arms 7. Each of the wheels 10 and 11 have secured to their rims, at points in proximity of the inner marginal edges thereof, annular flanges 12 by means of rivets 13 or the like. Upon the depending portions of the annular flanges 12, I detachably mount a plurality of circumferentially disposed gear teeth 14, said gear teeth being provided with concentric openings through which bolts 15 are passed. The threaded extremities of the bolts 15 are passed through the adjacent portions of the flanges, whereat, they are secured through the medium of locking nuts 15', which, are turned into engagement therewith. The demountable gear teeth 14, may be and preferably are formed with convex side walls or are substantially oval, thereby, facilitating engagement with the same from various angles. By this means, it will be understood, that in the event that certain of the gear teeth 14 become broken or otherwise unfit for use, they may be readily removed and others substituted therefor with but little effort.

With a view toward providing means for transmitting the driving power to the wheels 10 and 11 of the tractor and for supporting the said transmitting means, there is provided a casing member 16 having annular sleeve portions 17 formed upon the opposite sides thereof and adapted to be received between the rear extremities of the side bars 2 and 3. Suitable bearing brackets, generally indicated by the numeral 19, are arranged within the casing 16 and the sleeve 17 and receive therethrough a transversely disposed driven shaft, 20, the said shaft having keyed thereto a spiral gear 21, which gear is adapted to mesh with a larger spiral gear 22, fixedly mounted upon a longitudinally extending driving shaft 23, which shaft is mounted within suitable bearings formed in the opposite ends of the casing 16 and is indirectly connected, by means of speed gearing, designated by the numeral 24, with a suitable prime mover 25, such as an internal combustion engine or the like, the said prime mover being mounted near the forward extremities of the side bars 2 and 3 in an efficient manner. It is to be understood, that the bearings for supporting the driven and driving shaft may be of the anti-frictional type thus lending to the power of the tractor. Sprocket wheels 26 are mounted upon the opposite extremities of the transversely disposed driven shaft and have the teeth thereof meshing with the circumferentially disposed gear teeth 14 of the wheels 10 and 11. Thus, it will be appreciated, that power will be transmitted from the prime mover by way of the variable speed gearing to the driving shaft, from whence it will be transmitted to the driven shaft for propelling the tractor. Upon the rear or free extremity of the driving shaft, there is preferably mounted a pulley 27, thereby, providing for means which will permit the prime mover of the tractor to be used for other purposes than for propelling the same by merely disengaging the variable speed gearing. If so desired, the sprocket wheels as arranged upon the driven shaft may be adjustably mounted thereon in order that the same may be moved out of engagement with the gear teeth 14. The pulley 27 may be supplied with an endless belt or other similar form of gearing to facilitate the transmission of power therefrom to the desired apparatus. The pulley 27 is provided with a plurality of radially disposed spokes, said spokes being formed to constitute fan blades. Thus, when the pulley is rotated, the draft of air will be directed on to the casing 16, consequently, serving as means for cooling the same and should any amount of lubricant be contained thereby for lubricating the gearing therein, also cooling the said lubricant.

Referring now to the steering gear of the tractor, the upper portions of the divergent arms 7 have secured thereto or formed integral therewith, segmental gears 28, each of said gears projecting inwardly and being engaged with the teeth of a pinion 29 as carried upon the steering column 30, which column is rotatably mounted within the collar 31 of a bracket arm 32 mounted upon the upper portion of the casing 16. A steering wheel 33 is arranged upon the upper extremity of the column 31 and obviously, provides for means whereby rotation of the said column will be facilitated. By so arranging the segmental gears 28 upon the divergent arms 7, the wheels 11 as mounted thereupon may be shifted at will by the tractor operator when it is desired to vary or change the course of the vehicle. By forming the sides of the said gear teeth 14 convex, movement of the same with relation to the gear teeth of the said sprocket wheel is permitted.

As a means for resiliently supporting the prime mover of the tractor, thereby, preventing the transmission of shock, or vibration to the delicate mechanism of the same, the forward portions thereof bear directly upon the cross bar 9. As will be noted, the said cross bar 9 is supported below the inturned end of the side bars 2 and 3 by spring suspension means, which means include vertically disposed bolts 34, which bolts are slidably received within openings as formed in the inturned ends 4 of the said side bars, the lower extremities of the bolts being bifurcated as at 35, whereby, the respective ends of the cross bar 9 may be received between the same and pivotally connected thereto through the medium of cross pins 36, which pins are passed through the opposite arms of the bifurcated portion. Expansible coiled springs 38 are arranged about the bolts 34, preferably, bearing upon the upper and lower faces of the said side bars 2 and 3. By so mounting the cross bar 9 upon the side bars of the tractor, it will be appreciated, that I have provided efficient shock absorbing means, which means will prevent injury to the prime mover, also, to the variable speed gearing of the tractor, by means of jolts, shocks or the like.

Brake drums 39 are carried upon the transversely disposed driven shaft and have arranged thereabout the usual flexible braking bands, which bands are adapted to be operated through the medium of a lever 41, as arranged upon the tractor in proximity of the operator. It is to be also understood, that the variable speed gearing may be supplied with a suitable lever, the lever being preferably arranged at a point convenient to the tractor operator, whereby, the same may be readily shifted to obtain the desired speed and drives. Thus, by shifting the lever as connected with the speed gearing, the speed of the tractor together with the direction of travel may be governed at will by the operator.

A draw bar 43 is pivotally connected to the casing 16, as at 44 and extends rearwardly of the tractor frame in order that the conventional form of spring or resilient draft connection, indicated in its entirety by the numeral 44, may be engaged therewith. The draft pole or other appliances of the device to be drawn by the tractor may be thus readily engaged with the draft connection, by means of the adjustable clevis as carried thereby.

A suitable seat 45 is secured to the divergent arms 7, at a point in proximity of the brake controlling and variable speed controlling lever.

As is usual in motor driven vehicles, wherein internal combustion engines are employed as the primary movers therefor, a hood or housing 46 is arranged about the edges and is supplied with the usual radiators 47, whereby, the engine may be cooled and protected. Furthermore, the said hood is provided with a suitable extension 49, whereby, the variable speed gearing will be covered thereby, thus, protecting the same from the elements and preventing rapid deterioration thereof.

From the foregoing, it will be appreciated by workers skilled in the art that I have provided a four-wheel drive tractor, wherein the driving power as produced will be directly and evenly applied to each of the wheels thereof, consequently, allowing the greatest possible driving force to be obtained. Furthermore, by reason of the improved steering mechanism, the tractor is rendered readily dirigible and may be governed throughout its course with comparative ease by the operator.

As many changes could be made in the above construction and many apparently widely different embodiments of the invention could be made without departing from the scope thereof, it is intended that all matter contained in the above description or shown in the accompanying drawings, shall be interpreted as illustrative and not in a limiting sense. It is also to be understood, that the language used in the following claims is intended to cover all of the generic and specific features of the invention herein described and all statements of the scope of the invention, which, as a matter of language may be said to fall therebetween.

I claim:

1. In a four wheel drive tractor, a frame including side bars having certain of their ends forked and enlarged to provide bearings, divergent arms pivotally engaged with the forked ends of the said side bars, segmental gears on said divergent arms, a steering column, a pinion on said steering column meshing with said segmental gears, a casing supported upon the bearings of the side arms, and power transmitting means in said casing, said power transmitting means being connected to the tractor wheels and to the prime mover of the tractor.

2. In a four wheel drive tractor, a frame including side bars having certain of their ends forked and enlarged to provide bearings, certain others of the ends of said side bars being bent inwardly and provided with bearing openings, divergent arms pivotally engaged with the forked ends of said side bars, segmental gears on said divergent arms, a steering column, a pinion on said steering column meshing with said segmental gears, a casing supported upon the bearings of the side arms, a prime mover, means engaged with the bearings of the inturned ends of said side bars for resiliently supporting said prime mover, and power transmitting means in said casing, said transmission means being connected to the tractor wheels and to the prime mover.

3. In a four wheel drive tractor, the combination with a frame including side bars having bearings formed in certain of the ends thereof and other arms pivotally engaged with said side arms at points in proximity of said bearings, a prime mover mounted on the frame, a longitudinally disposed driving shaft connected to said prime mover, a casing engaged and supported within the bearings of said side arms, a transversely disposed driven shaft mounted within said casing and intergeared with the driving shaft, and adjustable means arranged on said driven shaft and engaged with the wheels of the tractor for imparting driving motion thereto.

4. In a four wheel drive tractor, the combination with a wheeled frame including side bars having certain of their ends forked and enlarged to provide bearing openings, other arms pivotally engaged with said side arms at points in proximity of said forked ends, means engaged with said other arm to permit steering of the same, a prime mover mounted on the frame, a longitudinally disposed driven shaft connected to said prime mover, a casing mounted within the bearings of the side arms, a transversely disposed shaft arranged within said casing and intergeared with said driving shaft, a plurality of adjustable sprocket wheels arranged upon the opposite ends of said transversely disposed shaft, and circumferentially disposed gear teeth mounted upon the wheels of the tractor and engaged with said sprocket wheels whereby to permit the transmission of driving power thereto.

5. In a four wheel drive tractor, the combination with a wheeled frame including side bars having bearings formed in certain of the ends thereof, other bars pivotally engaged with said side bars, of segmental gears arranged upon said other bars, steering means engaged with said segmental gears, resilient supporting means arranged upon the side bars, a prime mover on said resilient supporting means, a longitudinally disposed driven shaft connected to said prime mover, a casing mounted within the bearings of the side arms, a transversely disposed driven shaft arranged in said casing and intergeared with the driving shaft, a plurality of adjustable sprocket wheels mounted upon the opposite ends of said driven shaft, circumferentially disposed gear teeth arranged upon the wheels of the tractor adjacent the rim portion thereof and adapted to be engaged with said sprocket wheels whereby to permit the transmission of driving power thereto, and a pulley mounted upon the free extremity of said driving shaft, as and for the purpose set forth.

In testimony whereof, I affix my signature hereto.

GEORGE ALBERT WHITTEMORE.